Figure 1:
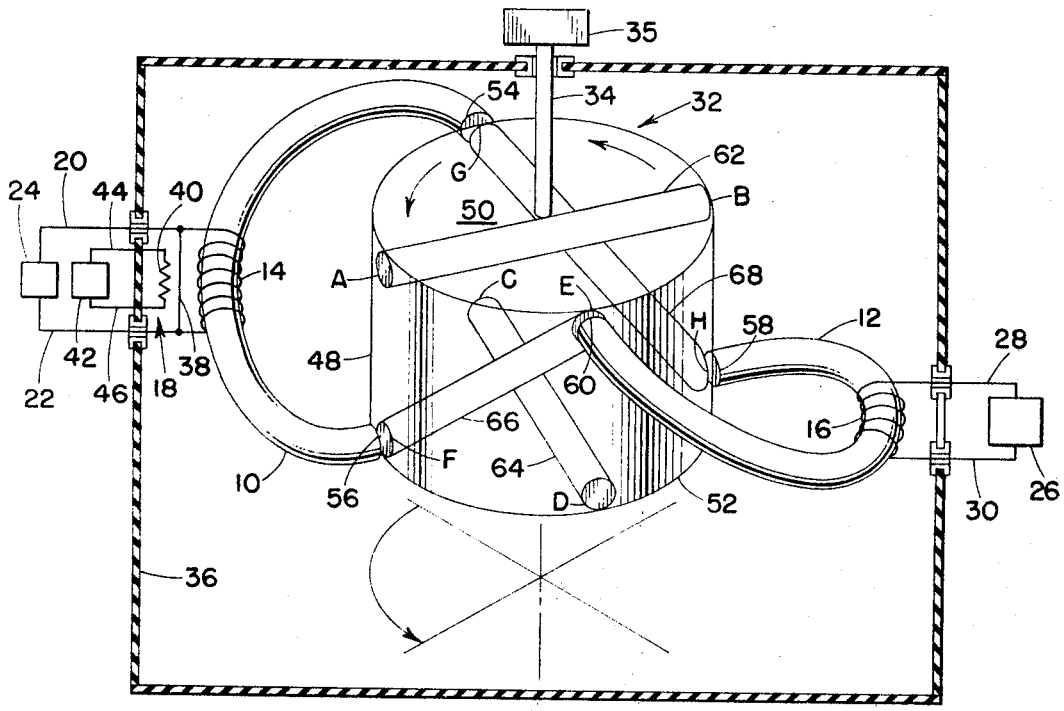

July 16, 1968    J. C. FAKAN    3,393,332

SUPERCONDUCTING ALTERNATOR

Filed Sept. 28, 1965

INVENTOR
JOHN C. FAKAN

BY

*Q. McCoy*
*Gene E. Shook*

ATTORNEYS

United States Patent Office 3,393,332
Patented July 16, 1968

3,393,332
SUPERCONDUCTING ALTERNATOR
John C. Fakan, North Olmsted, Ohio, assignor to the United States of America as represented by the Administrator of the National Aeronautics and Space Administration
Filed Sept. 28, 1965, Ser. No. 491,058
10 Claims. (Cl. 310—10)

The invention described herein may be manufactured and used by or for the Government of the United States of America for governmental purposes without the payment of any royalties thereon or therefor.

This invention is concerned with the conversion of rotational, mechanical energy into electrical energy. More particularly, the invention relates to an improved alternator which utilizes windings that are cooled below their critical temperature to form superconductors.

Present day generators and alternators suffer losses of energy because of the ohmic resistance of the conductors from which they are constructed. These energy losses lower the efficiency of the operation of these devices.

This problem of lowered operating efficiency has been solved by the alternator of the present invention. An alternator constructed in accordance with this invention utilizes superconducting materials which can carry currents without a loss of power thereby enabling high system efficiencies to be realized. The use of superconducting materials facilitates the utilization of more intense or stronger magnetic fields than in conventional devices. Thus, the power density is increased over that attained in conventional devices.

It is, therefore, an object of the present invention to provide an improved device for producing electrical energy.

Another object of the invention is to provide an improved device which converts rotational, mechanical energy into electrical energy.

Still another object of the invention is to provide an improved alternator which utilizes superconducting materials for high operating efficiency.

These and other objects of the invention will be apparent from the specification which follows and from the drawings wherein like numerals are used throughout to identify like parts.

Figure 2:
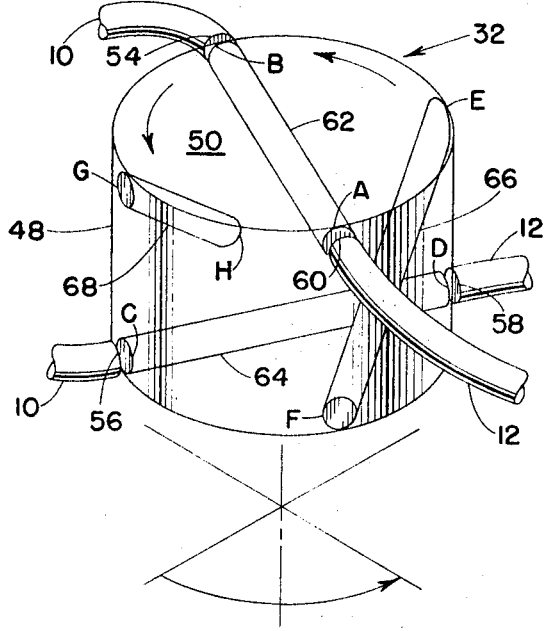

In the drawings:

FIG. 1 is a sectional view of an alternator constructed in accordance with the present invention; and FIG. 2 is an enlarged perspective view of the flux commutator portion of the alternator.

Referring now to FIGURE 1, there is shown an electrical generating device constructed in accordance with the present invention. This device comprises a pair of spaced cores 10 and 12 of a magnetic material. A field winding 14 of a superconductive material is formed around the core 10, and an output winding 16 of superconductive material is formed about the core 12. The output winding may be of a nonsuperconductive material for certain applications.

A persistent current switch 18 is connected to the field winding 14 while a pair of leads 20 and 22 connect this field winding to a suitable external power supply 24. The output winding 16 is connected to an external load 26 by leads 28 and 30.

A flux commutating device 32 is mounted between the cores 10 and 12 on a shaft 34 that is rotated by a motor 35. The flux commutator 32 as well as the cores 10 and 12 together with their windings and the persistent current switch 18 are enclosed in an insulating container 36. The container 36 is filled with a suitable cryogenic fluid, such as liquid helium, which cools the superconductive materials below their critical temperature.

The persistent current switch 18 comprises a shunt 38 of a superconductive material that is connected to the opposite ends of the field winding 14. The persistent current switch 18 further includes a resistance heater 40 that is connected to an external power supply 42 through leads 44 and 46.

The flux commutator 32 comprises a cylindrical disc 48 which carries bars or rods of magnetic material. As shown in FIGS. 1 and 2, the disc 48 has an upper surface 50 and a lower surface 52 in planes perpendicular to the axis of rotation of the shaft 34. The field core 10 has one end 54 adjacent the upper surface 50 and an opposite end 56 adjacent the lower surface 52. The ends 54 and 56 of the field core 10 are spaced 90 degrees relative to the axis of the shaft 34.

The load core 12 has an end 58 adjacent the lower surface 52 and an opposed end 60 adjacent the upper surface 50 as shown in FIGS. 1 and 2. The ends 58 and 60 are positioned 90 degrees from each other relative to the axis of the shaft 34.

As shown in FIGS. 1 and 2, the disc 48 of the flux commutator 32 mounts a bar 62 of magnetic material which extends along the upper surface 50. The bar 62 has opposed ends A and B. When the flux commutator 32 is in the position shown in FIG. 1 the ends A and B are spaced 90 degrees from the end 54 of the field core 10 and the end 60 of the load core 12. In FIG. 2 the flux commutator 32 has been rotated through an angle of 90 degrees in a counterclockwise direction, and the ends B and A are adjacent the ends 54 and 60 of the cores 10 and 12 respectively.

A similar bar 64 extends along the lower surface 52 of the disc 48 as shown in FIGS. 1 and 2. The bar 64 is at right angles to the bar 62 and has opposed ends C and D.

The disc 48 further includes a bar 66 of magnetic material which extends diagonally from the upper surface 50 to the lower surface 52. The bar 66 has an end E at the surface 50 and spaced 90 degrees relative to the ends A and B of the bar 62. When the flux commutator 32 is in the position shown in FIG. 1, the end E of the bar 66 is adjacent the end 60 of the load core 12. Likewise, the opposite end F of the bar 66 at the lower surface 52 is adjacent the end 56 of the field core 10.

Still another bar 68 is carried by the disc 48 in a plane parallel to the plane of the bar 66. The bar 68 has one end G at the upper surface 50 of the disc 48 and an opposite end H at the lower surface 52. When the flux commutator 32 is in the position shown in FIG. 1, the end G of the bar 68 is adjacent the end 54 of the field core 10 while the opposite end H is adjacent the end 58 of the load core 12.

In operation, the persistent current switch 18 is actuated by supplying power to the heater 40 through the leads 44 and 46. When the shunt 38 is heated above its critical temperature, the field winding 14 is charged from the external power source 24 through the leads 20 and 22. The power to the heater 40 is then interrupted allowing the shunt 38 to cool below its critical temperature so that it will act as a shunt between the ends of the field winding 14. Thereupon the power to the field winding 14 through the leads 20 and 22 is interrupted, and the field winding 14 with tis core 10 acts as a permanent electromagnet.

Rotation of flux commutator 32 about the shaft 34 causes the magnetic flux developed by the field winding 14 to be alternately switched from one direction to the other in the output winding 16 in a conventional manner to produce an alternating current to the load 26. This switching action is accomplished by the bars 62, 64, 66 and 68 of flux conducting material in the flux commutator disc 48.

More particularly, when the commutator 32 is in the position shown in FIG. 2 the end 54 of the field core 10 is in magnetic communication with the end 60 of the load core 12 through the bar 62 as explained earlier. Likewise, the end 56 of the field core 10 is in magnetic communication with the end 58 of the load core 12 through the bar 64.

Rotation of the flux commutator 32 in the counterclockwise direction through an angle of 90 degrees to the position shown in FIG. 1 places the end 54 of the field core 10 in magnetic communication with the end 58 of the load core 12 through the bar 68. In this position of the commutator 32 the end 56 of the field core 10 is placed in magnetic communication with the end 60 of the load core 12 through the bar 66.

Continued rotation of the flux commutator 32 through an angle of 90 degrees again places the ends 54 and 56 of the field core 10 in magnetic communication with the ends 60 and 58, respectively, of the load core 12 through the bars 62 and 64, respectively. In this last named position the ends A and B of the bar 62 as well as the ends C and D of the bar 64 will be reversed from the positions shown in FIG. 2.

While the preferred embodiment of the invention has been shown and described, it will be appreciated that various structural modifications may be made to the alternator without departing from the spirit of the invention or the scope of the subjoined claims.

What is claimed is:
1. An electrical generating device comprising:
   a flux commutator,
   a first core having opposed ends adjacent said flux commutator,
   a second core having ends adjacent said flux commutator and spaced from said opposed ends of said first core,
   a winding formed around said second core,
   a winding of superconductive material formed around said first core,
   a persistent current switch connected to said superconductive winding,
   means for cooling said superconductive winding and said persistent current switch below their critical temperatures,
   means for selectively actuating said persistent current switch,
   means for initially charging said superconductive winding upon actuation of said persistent current switch, and
   means for rotating said flux commutator to alternately switch the magnetic flux developed by said superconductive winding from one direction to the other in said first named winding for producing an alternating current.

2. An electrical generating device as claimed in claim 1 wherein the rotatable flux commutator includes:
   first means for placing the opposed ends of the first core in magnetic communication with the ends of the second core in a first position of the flux commutator, and
   second means for placing said opposed ends of said first core in magnetic communication with the alternate ends of said second core in a second position of the flux commutator.

3. An electrical generating device as claimed in claim 2 wherein the rotatable flux commutator includes:
   a first pair of magnetic members positioned in first parallel planes and at right angles to one another, and
   a second pair of magnetic members positioned in second parallel planes and at right angles to one another, said second parallel planes being normal to said first parallel planes.

4. An electrical generating device as claimed in claim 3 wherein:
   the first pair of magnetic members place the opposed ends of the first core in magnetic communication with the ends of the second core in the first position of the flux commutator, and
   the second pair of magnetic members place said opposed ends of said first core in magnetic communication with the alternate ends of said second core in the second position of the flux commutator.

5. An electrical generating device as claimed in claim 4 wherein:
   the first parallel planes are normal to the axis of rotation of the flux commutator and the magnetic flux passes through the cores and the first pair of magnetic members along a figure-eight path in the first position of the flux commutator, and
   the second parallel planes are parallel to the axis of rotation of the flux commutator and the magnetic flux passes through the cores and the second pair of magnetic members along a closed loop path in the second position of the flux commutator.

6. Apparatus for generating an alternating current comprising:
   a pair of spaced cores, each having a first end in a first plane and a second end in a second plane parallel to said first plane,
   a flux commutator mounted between said spaced cores, said commutator having,
   means for placing said first end of one of said cores in magnetic communication with said first end of the other of said cores and said second end of said one of said cores in magnetic communication with said second end of said other core in a first position, said commutator further having:
      means for placing said first end of said one of said cores in magnetic communication with said second end of said other core and said second end of said one of said cores in magnetic communication with said first end of said other core in a second position,
   a winding formed around said one of said cores,
   a winding of superconductive material formed around said other of said cores,
   a persistent current switch connected to said superconductive winding,
   means for cooling said superconductive winding and said persistent current switch below their critical temperatures,
   means for selectively actuating said persistent current switch,
   means for initially charging said superconductive winding upon actuation of said persistent current switch to form a permanent electromagnet, and
   means for moving said flux commutator alternately between said first position and said second position after forming said permanent electromagnet.

7. Apparatus for generating an alternating current as claimed in claim 6 including:
   means for rotating the flux commutator about an axis normal to the first and second planes.

8. An alternator comprising:
   a field core having a winding of superconductive material formed thereon,
   a load core spaced from said field core and having a winding formed thereon,
   a shunt of superconductive material connected to the ends of said superconducting winding on said field core,
   means for cooling said field winding and said shunt below their critical temperatures,
   means for selectively heating said shunt above its critical temperature,
   means for initially charging said field core upon heating said shunt, a flux commutator mounted between said field core and said load core, said commutator having:

means for placing a first end of said field core in magnetic communication with a first end of said load core and a second end of said field core in magnetic communication with a second end of said load core in a first position, said commutator further having:

means for placing said first end of said field core in magnetic communication with said second end of said load core and said second end of said field core in magnetic communication with said first end of said load core in said second position, and means for rotating said commutator sequentially from said first position to said second position subsequent to the initial charging of said superconducting winding and the cooling of said shunt below its critical temperature.

9. An electrical generating device comprising:

a flux commutator mounted for rotation about an axis, a curved field core having opposite ends adjacent said commutator, one of said ends being positioned in a first plane normal to said axis, and the other of said ends being positioned at a second plane parallel to said first plane, a curved load core having a winding thereon adapted to be connected to a load, said load core having one end adjacent said commutator at said first plane, and another end adjacent said commutator at said second plane, a winding of superconductive material formed around said field core, a shunt of superconductive material connected to the ends of said field winding, means for cooling said field winding and said shunt below their critical temperatures, means for selectively heating said shunt above its critical temperature, means for initially charging said field winding upon heating said shunt, and means for rotating said flux commutator about said axis subsequent to the initial charging of said field winding and the cooling of said shunt below its critical temperature, said flux commutator having:

means for placing said one of said ends of said field core in magnetic communication with said one end of said load core and said other end of said field core in magnetic communication with said other end of said load core in a first position of said flux commutator, and means for placing said one end of said field core in magnetic communication with said other end of said load core and said other end of said field core in magnetic communication with said one end of said load core in a second position of said flux commutator.

10. An alternator comprising:

a flux commutator mounted for rotation about its normal axis and having a pair of parallel surfaces normal to said axis, a curved field core having:

a first end adjacent said commutator at one of said surfaces, and a second end adjacent said commutator at the other of said surfaces and positioned at right angles to said first end relative to said axis, a curved load core having a winding thereon adapted to be connected to a load, one end of said load core being adjacent said commutator at said one of said surfaces and diametrically opposite said first end of said field core, and another end of said load core being adjacent said commutator at said other of said surfaces and diametrically opposite said second end of said field core, a field winding of superconducting material formed around said field core, a shunt of superconducting material connected to the end of said field winding, means for cooling said field winding and said shunt below their critical temperatures, means for selectively heating said shunt above its critical temperature, means for initially charging said field winding upon heating said shunt, and means for rotating said flux commutator for changing the magnetic field within the load winding subsequent to the initial charging of said field winding and the cooling of said shunt below its critical temperature, said rotating means being operable to move said flux commutator between a first position wherein said first and second ends of said field core are placed in magnetic communication with said one and other ends of said load core respectively and a second position wherein said first and second ends of said field core are placed in magnetic communication with said other and one ends of said load core respectively.

References Cited

UNITED STATES PATENTS 3,098,189   7/1963   Buchhold _____ 321—8

MILTON O. HIRSHFIELD, *Primary Examiner.*

D. X. SLINEY, *Assistant Examiner.*